Figure 1:
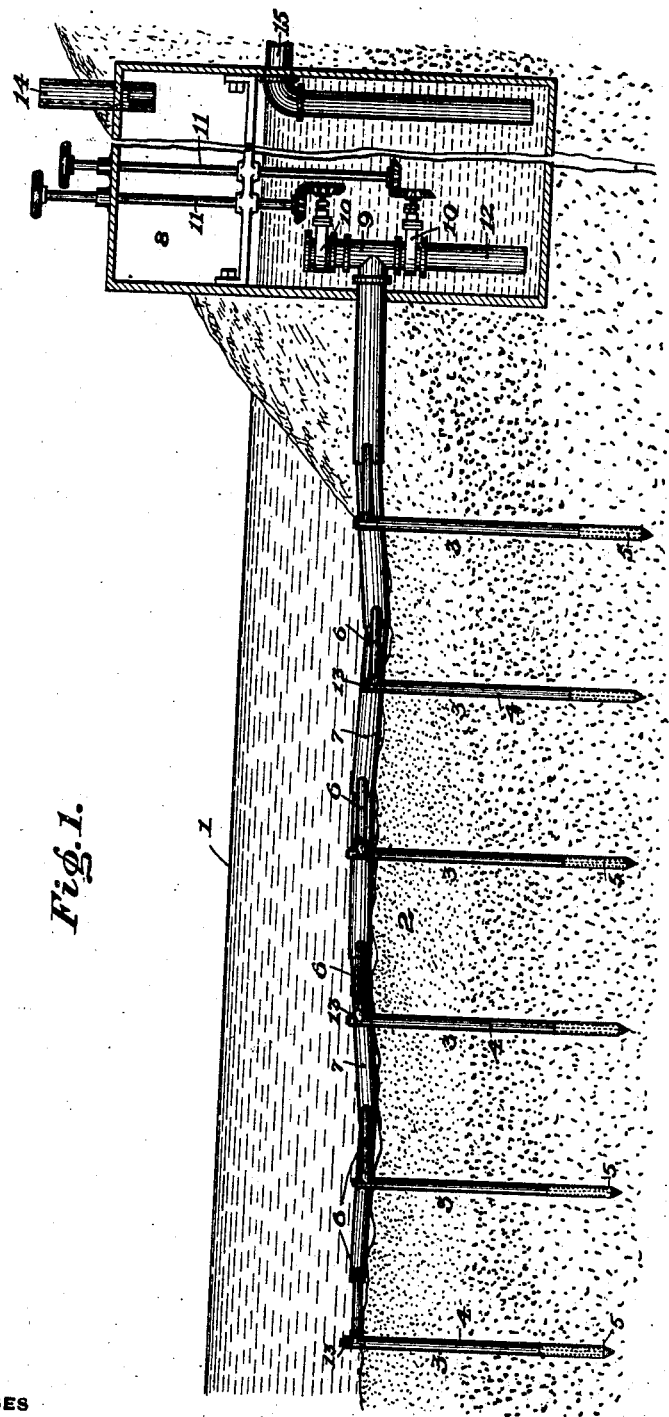

No. 837,566.

PATENTED DEC. 4, 1906.

J. H. HEINZ.
FILTRATION SYSTEM.
APPLICATION FILED MAR. 28, 1906.

2 SHEETS—SHEET 1.

WITNESSES

INVENTOR
John H. Heinz, by
Edward A. Lawrence,
his attorney

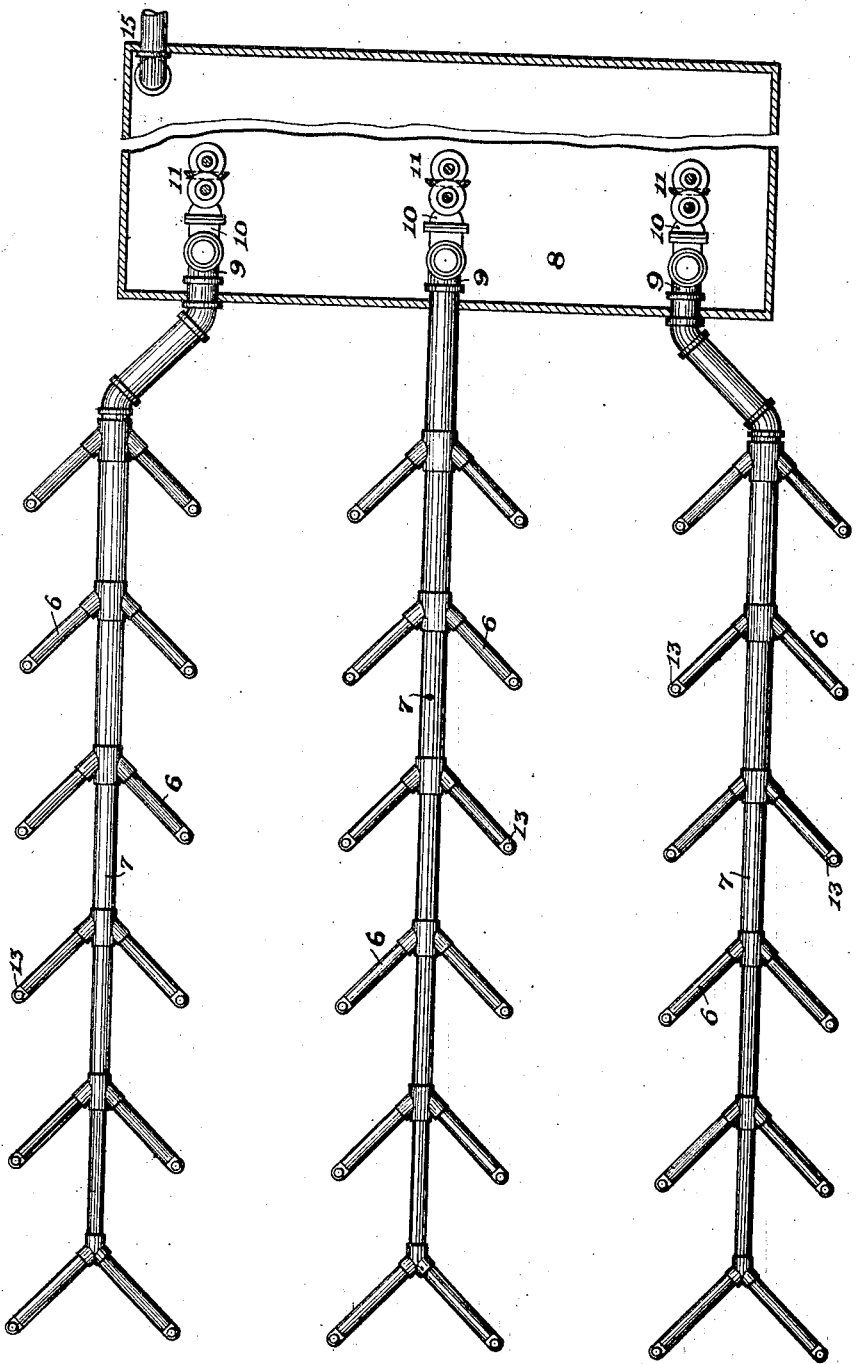

UNITED STATES PATENT OFFICE.

JOHN H. HEINZ, OF MARION, INDIANA.

FILTRATION SYSTEM.

No. 837,566.          Specification of Letters Patent.          Patented Dec. 4, 1906.

Application filed March 28, 1906. Serial No. 308,410.

*To all whom it may concern:*

Be it known that I, JOHN H. HEINZ, a citizen of the United States, residing in the city of Marion, in the county of Grant and State of Indiana, have invented or discovered new and useful Improvements in Filtration Systems, of which the following is a specification.

My invention consists of a new and improved filtration system for the supply of pure water from a stream or other body of water.

It consists of sinking a well or wells in the bed of said body of water, casing off the same, so that the water can enter said wells only through suitable straining means in the bottoms thereof, and leading the water from said wells by means of line-pipes under the surface of said body of water into a suitable reservoir, into which it is downwardly discharged by means of an inlet-pipe extending within said reservoir to a point adjacent to the bottom thereof. By this means the pressure of discharge is maintained in reverse ratio to the height of water in said inlet-pipe and the reservoir.

In the accompanying drawings, Figure 1 is a vertical section of the bed and bank of a river or other body of water, showing my system installed; and Fig. 2 is a diagram in plan of the same.

The following is a detailed description of said drawings.

1 is a river or other body of water, and 2 is the natural bed thereof, usually composed of layers of sand and gravel, or either, substantially as indicated in Fig. 1. Into this natural filter-bed I drive a plurality of wells 3 3 to the proper depth to secure the required thickness of filtering material, usually about thirty or forty feet. Said wells are cased off by means of casing 4 4, and 5 5 are the usual strainers inserted in the bottom of said casings. I find two-inch casing to be a convenient and satisfactory size and preferably space my wells apart at least twenty-five feet to obtain a sufficient area of filter-bed to supply the requisite quantity of water to each well. The casing 4 4 is led up into the body of water, and that of each well is closed off and connected by substantially horizontal pipes 6 6 to a line-pipe 7. I prefer to drive my wells in parallel lines, as shown in Fig. 2, and lay a line-pipe 7 between adjacent lines of wells, as shown. Said line-pipes 7 7 may be laid on the bed of the river, as shown in Fig. 1, or may be otherwise supported beneath the surface of the water, preferably not less than three feet beneath the same, as a sufficient depth is required to drive the water through the line-pipes into the reservoir. By increasing the diameter of the line-pipes as they approach their discharge ends I am enabled to accommodate the increasing volume of water from the wells without difficulty. This gradual increase in diameter is illustrated in the drawings. 8 is the reservoir or tank into which said line-pipes 7 7 discharge below the level of the water in the river. Said reservoir may be located on the bank of the stream, as shown, or in any other convenient position—as, for instance, in the river-bed. It is preferably built up to a height sufficient to prevent the river overflowing into it in time of high water or may be closed over with a water-tight cover for the same purpose. Its bottom is considerably below the water-level of the river to provide the requisite capacity, as the water-level of the river is the limit of water-level in the reservoir.

It is evident that a continuous flow of filtered water is secured through pipes 7 7, which enter the reservoir below the water-level of the river as long as the level of water in the reservoir is below that of the river.

9 9 are T-sections attached to the discharge ends of line-pipes 7 7 within the reservoir 8, each arm of said sections being preferably provided with gates 10 10, which are preferably operatable from without the reservoir by means of suitable mechanism 11 11. 12 is an additional section of pipe attached to each of the T's 10 10 and extending downwardly in the interior of the reservoir to a point adjacent to the bottom thereof. The office of this downwardly-extending section 12 is to increase the pressure of inflow of water, as will be explained.

Assuming the level of water in the reservoir to be reduced by withdrawal or otherwise to a point below the level of the discharge end of pipe 7, a vacuum more or less perfect will be formed in pipe 12 between the level of water standing in said pipe and the discharge end of pipe 7. In other words, the stream of water discharging from pipe 7 is thus released from the atmospheric back pressure, which in effect amounts to by so much increasing the pressure of flow from the wells, a sort of a downdraft being formed in pipe 12. Theoretically for every twenty-seven inches of height in said void or vacuum the pressure of discharge is increased by one pound, so that the lower the level of water in said reservoir and the faster the same is withdrawn therefrom the faster the water enters through pipe 7 and the greater the pressure of said entrance as long as sufficient water remains in the reservoir to form a water seal for the lower end of pipe 12 to prevent the entrance of atmospheric air.

The use of the gates 10 10 is as follows: Normally the upper gate is closed and the lower gate open to admit the water to pipe 12. In case it is desired to clean the wells connected to a given line-pipe 7 the lower gate 10 is closed and the upper gate opened. A steam, air, or water pressure line is now attached to the upper arm of the T 9 and a back pressure set up in the line-pipe 7 and the connecting-wells, whereby any foreign matter is quickly blown out of the same. By this means also any deposit of mud, silt, or other impurity may be blown away from the bottom of the wells.

I prefer to connect the well-casing 4 4 at the top to the pipes 6 6 by means of T members 13 13, the arms of the T being set vertically, as in Fig. 1, and the upwardly-extending arm being normally closed by a plug. By removing said plug it is evident access at all times may be gained to the interior of the wells for repairs to or replacement of the strainers 5 5 or for such other purposes as may be required.

If the reservoir be closed over on top, as shown in Fig. 1, I provide a vent-pipe 14, leading up beyond high-water mark to prevent back pressure in the reservoir against the rising water-level. The outtake-pipe is preferably led out of the reservoir at a level not higher than the water-level of the river to prevent suction in the pumps, and the same is led down within the reservoir to a point adjacent to the bottom of the reservoir to permit withdrawal at any level. Said pipe is marked 15.

It is evident from the above that my system provides a complete, satisfactory, and automatic filtering means wherein the natural bed of the river is used. A filter-bed and the natural river-pressure automatically delivers the water to the reservoir wherein it is discharged at a pressure in inverse ratio to the level of water in said reservoir. The action is not forced, but natural, so that the water seeps through the filtering-bed, so that there is no suction or drawing in of foreign material into the supply. The mud and filth strained out of the water is deposited on top of the filter-bed, whence it is washed away by the next freshet. The system is capable of infinite extension as need requires, additional wells being sunk and line-pipes connected to the reservoir as desired.

What I desire to claim is—

1. A filtration system consisting of a well in the bed of a body of water, a reservoir, a pipe leading the water from said well into said reservoir below the level of said body of water and a discharge-tube connected with said pipe and extending downwardly within said reservoir, substantially as and for the purpose described.

2. A filtration system consisting of a well driven into the bed of a body of water and cased up above the bottom thereof, a reservoir, a line-pipe beneath the surface of said body of water connecting said well with said reservoir and a discharge-tube connected with said line-pipe and extending downwardly within said reservoir to a point adjacent to the bottom thereof, substantially as and for the purposes set forth.

Signed at Pittsburg, Pennsylvania, this 27th day of March, 1906.

JOHN H. HEINZ.

Witnesses:
J. H. HARRISON,
EDWARD A. LAWRENCE.